United States Patent
Zhuang et al.

(10) Patent No.: US 9,223,374 B2
(45) Date of Patent: Dec. 29, 2015

(54) POWER SOURCING EQUIPMENT CHIP POWER SOURCING EQUIPMENT AND POWER OVER ETHERNET SYSTEM AND METHOD USING REGISTERS AND SLAVE ADDRESS

(71) Applicant: Huawei Technologies Co., Ltd., Shenzhen (CN)

(72) Inventors: Yan Zhuang, Nanjing (CN); Chao Zhao, Nanjing (CN); Shiyong Fu, Nanjing (CN); Rui Hua, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/675,072

(22) Filed: Mar. 31, 2015

(65) Prior Publication Data

US 2015/0293572 A1 Oct. 15, 2015

(30) Foreign Application Priority Data

Apr. 14, 2014 (CN) .......................... 2014 1 0146623

(51) Int. Cl.
 *G06F 1/00* (2006.01)
 *G06F 1/26* (2006.01)
 *G06F 13/40* (2006.01)
 *H04L 12/10* (2006.01)
 *H05B 37/00* (2006.01)

(52) U.S. Cl.
CPC ............ *G06F 1/266* (2013.01); *G06F 13/4022* (2013.01); *H04L 12/10* (2013.01); *H05B 37/00* (2013.01)

(58) Field of Classification Search
CPC ....................................................... G06F 1/266
See application file for complete search history.

(56) References Cited

U.S. PATENT DOCUMENTS

| 7,472,290 | B2 * | 12/2008 | Diab ....................... | G06F 1/189 713/300 |
| 8,412,961 | B2 * | 4/2013 | Gammel ................. | G06F 1/266 455/572 |
| 2007/0206749 | A1 * | 9/2007 | Pincu et al. ................ | 379/142.1 |

(Continued)

FOREIGN PATENT DOCUMENTS

EP  2403102 A1  1/2012

OTHER PUBLICATIONS

Linear Technology, "Power over Ethernet Controller with AC Disconnect," Quad IEEE 802.3af, LTC4259A, Jan. 2003, 32 pages.

(Continued)

*Primary Examiner* — Mohammed Rehman
(74) *Attorney, Agent, or Firm* — Conley Rose, P.C.; Grant Rodolph (57) ABSTRACT

A power sourcing equipment (PSE) chip controls a powering channel of the PSE chip according to a value stored in a first register; the PSE chip changes, in response to a second instruction, the value stored in the first register into a calculated value, where the second instruction includes a second slave address and a second data byte, the second slave address is a virtual address of a virtual powering group, and the calculated value is a result obtained by calculation according to the second data byte and a channel indication value that is of the virtual powering group and stored in the PSE chip. Information indicating whether a powering channel is added to a virtual powering group is stored in a PSE chip, so that powering channels added to a virtual powering group can be controlled at a time.

19 Claims, 2 Drawing Sheets

(56) References Cited

U.S. PATENT DOCUMENTS

| | | | |
|---|---|---|---|
| 2007/0237322 A1 | 10/2007 | Hussain et al. | |
| 2007/0263675 A1* | 11/2007 | Lum et al. | 370/910 |
| 2009/0083552 A1* | 3/2009 | Hussain et al. | 713/300 |
| 2009/0172656 A1 | 7/2009 | Landry et al. | |
| 2009/0228721 A1* | 9/2009 | Karam | H04L 12/10 713/300 |
| 2010/0106985 A1* | 4/2010 | Panguluri et al. | 713/300 |
| 2011/0258464 A1* | 10/2011 | Gammel | G06F 1/266 713/300 |
| 2013/0151025 A1* | 6/2013 | Wendt et al. | 700/295 |
| 2014/0365805 A1* | 12/2014 | Balasubramanian | G06F 1/28 713/340 |
| 2014/0372773 A1* | 12/2014 | Heath | H04L 12/10 713/300 |

OTHER PUBLICATIONS

Foreign Communication From a Counterpart Application, European Application No. 15160604.3, Extended European Search Report dated Aug. 27, 2015, 9 pages.

* cited by examiner

POWER SOURCING EQUIPMENT CHIP POWER SOURCING EQUIPMENT AND POWER OVER ETHERNET SYSTEM AND METHOD USING REGISTERS AND SLAVE ADDRESS

CROSS-REFERENCE TO RELATED APPLICATION

This application claims priority to Chinese Patent Application No. 201410146623.X, filed on Apr. 14, 2014, which is hereby incorporated by reference in its entirety.

TECHNICAL FIELD

This application relates to the field of power over Ethernet (PoE), and in particular, to a power sourcing equipment (PSE) chip, a PSE, and a PoE system and method.

BACKGROUND

Devices in a PoE system are divided into a PSE and a powered device (PD). The PSE supplies power to the powered device using an Ethernet cable. Generally, a plurality of different PDs powered by a single PSE greatly differs in form and function, and therefore the PSE manages power supply of the PDs based on ports.

In a lighting over Ethernet (LoE) application of PoE, a plurality of different PDs powered by a single PSE is an electric powered light source, for example, a light-emitting diode (LED). These PDs are similar in form and function. Further, in the LoE application, it may be required that a plurality of light sources be lighted simultaneously. The foregoing requirement cannot be satisfied by managing power supply of PDs based on ports.

SUMMARY

Embodiments of the present invention provide a PSE chip, a PSE, and a PoE system and method, so as to achieve simultaneous control of a plurality of PDs in a PoE system.

According to a first aspect, a PSE chip is provided, where the PSE chip includes a first register; the PSE chip is configured to control a powering channel of the PSE chip according to a value stored in the first register, where the value stored in the first register includes at least one control bit, and each of the at least one control bit corresponds to one of a powering channel of the PSE chip; the PSE chip changes, in response to a first instruction, the value stored in the first register to a first data byte in the first instruction, where the first instruction is a write instruction, the first instruction includes a first slave address, a first command byte, and the first data byte, the first slave address is an address of the PSE chip, and a value of the first command byte is an address of the first register; and the PSE chip changes, in response to a second instruction, the value stored in the first register to a calculated value, where the second instruction is a write instruction, the second instruction includes a second slave address, the first command byte, and a second data byte, the second slave address is a virtual address of a virtual powering group, and the calculated value is a result obtained by calculation according to the second data byte in the second instruction and a channel indication value that is of the virtual powering group and stored in the PSE chip, where the channel indication value of the virtual powering group includes at least one used bit, each of the at least one used bit corresponds to one of the at least one powering channel of the PSE chip, and a value of each of the at least one used bit indicates whether a corresponding powering channel is added to the virtual powering group.

With reference to the first aspect, in a first implementation manner of the first aspect, the PSE chip further includes a second register, and the second register stores the channel indication value of the virtual powering group.

With reference to the first implementation manner of the first aspect, in a second implementation manner of the first aspect, there is a plurality of virtual powering groups, the PSE chip includes a plurality of second registers, and a correspondence between the plurality of virtual powering groups and the plurality of second registers is bijection.

With reference to the first implementation manner or second implementation manner of the first aspect, in a third implementation manner of the first aspect, the PSE chip changes, in response to a third instruction, a value stored in the second register to a third data byte in the third instruction, where the third instruction is a write instruction, the third instruction includes the first slave address, a second command byte, and the third data byte, and the second command byte is an address of the second register.

With reference to the first aspect, in a fourth implementation manner of the first aspect, the PSE chip further includes a third register, and the third register stores one used bit of the at least one used bit of the channel indication value of the virtual powering group.

With reference to the fourth implementation manner of the first aspect, in a fifth implementation manner of the first aspect, there is a plurality of virtual powering groups, a mapping from a plurality of indication bits in a value stored in the third register to the plurality of virtual powering groups is injection, and each of the plurality of indication bits in the value stored in the third register stores the $x^{th}$ bit of the at least one used bit of the channel indication value of a corresponding virtual powering group, where x is an integer greater than or equal to 1.

With reference to the fourth implementation manner or the fifth implementation manner of the first aspect, in a sixth implementation manner of the first aspect, the PSE chip changes, in response to a fourth instruction, the value stored in the third register to a fourth data byte in the fourth instruction, where the fourth instruction is a write instruction, the fourth instruction includes the first slave address, a third command byte, and the fourth data byte, and the third command byte is an address of the third register.

According to a second aspect, a PSE is provided, where the PSE includes a processor, a memory, a port powering circuit, an Ethernet port, and the PSE chip according to any one of the first aspect and the first implementation manner to the sixth implementation manner of the first aspect; the processor is connected to the memory using a bus; the processor is connected to the PSE chip; the PSE chip is connected to the Ethernet port using the port powering circuit; and the memory stores a program, and the processor sends the first instruction and the second instruction to the PSE chip according to the program.

According to a third aspect, a PoE system is provided, where the PoE system includes a plurality of powered devices and the PSE according to the foregoing second aspect; and each of the plurality of powered devices is connected to the Ethernet port of the PSE.

With reference to the third aspect, in a first implementation manner of the third aspect, the PoE system is a LoE system, and the powered devices are electrical powered light sources.

According to a fourth aspect, a PoE method is provided, where the method includes: receiving, by a PSE chip, a first instruction; changing, by the PSE chip in response to the first instruction, a value stored in a first register to a first data byte in the first instruction, where the first instruction is a write instruction, the first instruction includes a first slave address, a first command byte, and the first data byte, the first slave address is an address of the PSE chip, a value of the first command byte is an address of the first register, the first register is in the PSE chip, the PSE chip is configured to control a powering channel of the PSE chip according to the value stored in the first register, the value stored in the first register includes at least one control bit, and each of the at least one control bit corresponds to one of a powering channel of the PSE chip; receiving, by the PSE chip, a second instruction; and changing, by the PSE chip in response to the second instruction, the value stored in the first register to a calculated value, where the second instruction is a write instruction, the second instruction includes a second slave address, the first command byte, and a second data byte, the second slave address is a virtual address of a virtual powering group, and the calculated value is a result obtained by calculation according to the second data byte in the second instruction and a channel indication value that is of the virtual powering group and stored in the PSE chip, where the channel indication value of the virtual powering group includes at least one used bit, each of the at least one used bit corresponds to one of the at least one powering channel of the PSE chip, and a value of each of the at least one used bit indicates whether a corresponding powering channel is added to the virtual powering group.

With reference to the fourth aspect, in a first implementation manner of the fourth aspect, the method further includes: receiving, by the PSE chip, a third instruction; and changing, by the PSE chip in response to the third instruction, a value stored in a second register to a third data byte in the third instruction, where the third instruction is a write instruction, the third instruction includes the first slave address, a second command byte, and the third data byte, and the second command byte is an address of the second register, where the second register is in the PSE chip, and the second register stores the channel indication value of the virtual powering group.

With reference to the first implementation manner of the fourth aspect, in a second implementation manner of the fourth aspect, there is a plurality of virtual powering groups, the PSE chip includes a plurality of second registers, and a correspondence between the plurality of virtual powering groups and the plurality of second registers is bijection.

With reference to the fourth aspect, in a third implementation manner of the fourth aspect, the method further includes: receiving, by the PSE chip, a fourth instruction; and changing, by the PSE chip in response to the fourth instruction, a value stored in a third register to a fourth data byte in the fourth instruction, where the fourth instruction is a write instruction, the fourth instruction includes the first slave address, a third command byte, and the fourth data byte, and the third command byte is an address of the third register, where the third register is in the PSE chip, and the third register stores one used bit of the at least one used bit of the channel indication value of the virtual powering group.

With reference to the third implementation manner of the fourth aspect, in a fourth implementation manner of the fourth aspect, there is a plurality of virtual powering groups, a mapping from a plurality of indication bits in the value stored in the third register to the plurality of virtual powering groups is injection, and each of the plurality of indication bits in the value stored in the third register stores the $x^{th}$ bit of the at least one used bit of the channel indication value of a corresponding virtual powering group, where x is an integer greater than or equal to 1.

According to the embodiments of the present invention, information indicating whether a powering channel is added to a virtual powering group is stored in a PSE chip, so that powering channels added to a virtual powering group can be controlled at a time.

DESCRIPTION OF EMBODIMENTS

A PSE chip is a chip designed to support a PSE function in a requirement of a PoE protocol, and generally can provide a detection function. Some PSE chips may further provide a classification function. Common PSE chips are as follows: MAX5952 and MAX5971B of Maxim Integrated, TPS23841 and TPS23851 of Texas Instruments, LTC4266, LTC4270, LTC4274, and LTC4290 of Linear Technology, and so on. Generally, in a PSE, a PSE chip is connected to a central processing unit (CPU) using an Inter-Integrated Circuit (IIC) bus. The CPU can read and write a register of the PSE chip using the IIC bus. The number of powering channels supported by the PSE chip may be 1, 4, 8, or 12. However, inside the PSE chip supporting 8 or 12 powering channels, four powering channels are used as a quad, and slave addresses of different quads are different, and therefore the CPU cannot implement, using a single IIC instruction, control over the 8 or 12 powering channels at a time. Further, if a PSE has a plurality of PSE chips and provides more powering channels than a single PSE chip, the CPU cannot implement, using a single IIC instruction, control over all powering channels of the plurality of PSE chips at a time.

Figure 1:
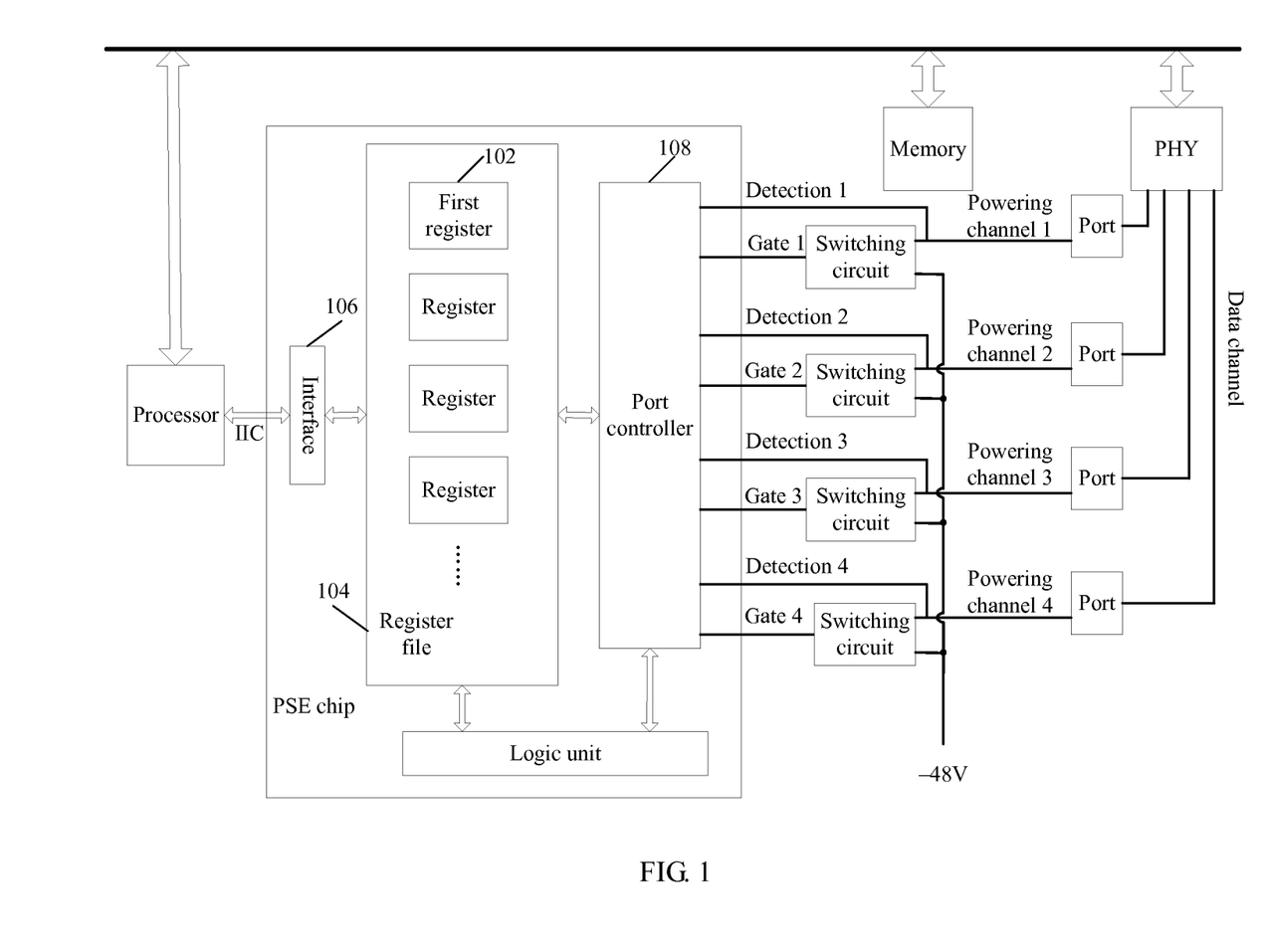
FIG. 1 is a structural diagram of a PSE according to an embodiment of the present invention.

The following describes an embodiment of the present invention with reference to FIG. 1.

FIG. 1 is a structural diagram of a PSE according to the embodiment of the present invention. The PSE may be a network switch, an Ethernet hub, a midspan device, a router, or another device having a PoE function. The PSE includes a processor, a memory, a PSE chip, a port powering circuit, and an Ethernet port. If the PSE is a network switch, an Ethernet hub, or a router, the PSE further includes an Ethernet physical layer (PHY) chip. The processor is connected to the memory and the PHY chip using a bus. The processor is connected to the PSE chip. The PHY chip provides an Ethernet data channel. The PSE chip controls a powering channel. The PSE chip is connected to the Ethernet port using the port powering circuit. The PHY chip is connected to the Ethernet port. FIG. 1 is drawn using four Ethernet ports as an example, but the number of Ethernet ports provided by the PSE is not limited thereto. The memory stores a program, and the processor sends, to the PSE chip according to the program, an instruction used for controlling a powering channel. For example, the processor may successively send, according to time predetermined in the program, a plurality of instructions used for controlling a powering channel; or the processor may provide a command-line interface (CLI) or graphical user interface (GUI) according to the program, and send, according to a command from the CLI or GUI, an instruction used for controlling a powering channel; or the processor may send, according to the program and a message from another device, an instruction used for controlling a powering channel, where the message may be received from an Ethernet port or may be received from another port, for example, a wireless network interface controller. The memory may be a volatile memory, for example, a random-access memory (RAM); or the memory may be a non-volatile memory, for example, a read-only memory (ROM), a flash memory, a hard disk drive (HDD), or a solid-state drive (SSD); or the memory may further be a combination of memories of the foregoing types. A power source supplied by the PSE to the Ethernet port is generally a −48 Volt (V) power source. The PSE may include a plurality of PSE chips, and the plurality of PSE chips is connected to the processor using a same bus, so as to receive an instruction sent by the processor.

The PSE chip includes a first register 102. The first register 102 may be in a register file 104. The PSE chip may further include an interface 106 and a port controller 108. The interface 106 is connected to the register file 104. The port controller 108 is connected to the register file 104. The PSE chip may further include a logic unit, the logic unit is connected to the register file 104, and the logic unit is connected to the port controller 108. The logic unit is a logic circuit that controls the PSE chip.

The interface 106 may be an IIC interface. The interface 106 is connected to the CPU, and the PSE chip receives, using the interface 106, an instruction sent by the CPU. The port controller 108 is connected to the port powering circuit outside the PSE chip using a pin of the PSE chip. The port controller 108 controls a corresponding powering channel of the PSE by changing output of a pin. The PSE chip controls the output of the pin of the PSE chip using the port controller 108 according to a value stored in the first register 102. The port powering circuit generally includes a switching circuit and a power source. The switching circuit may be a metal-oxide-semiconductor field-effect transistor (MOSFET), or may be another component having a switching function, for example, a junction gate field-effect transistor (JFET) or a bipolar junction transistor (BJT). In an example in which the switching circuit is an MOSFET, a gate pin of the PSE chip is connected to a gate of the MOSFET. The port controller 108 controls the corresponding powering channel of the PSE by changing a level that is output by the gate pin to the switching circuit. In a case in which the level of the gate pin of the PSE chip is a high level, the MOSFET is active; in a case in which the level of the gate pin of the PSE chip is a low level, the MOSFET is in cutoff mode. When the MOSFET is active, there is conduction between the power source and the Ethernet port, and the PSE supplies power to the Ethernet port. When the MOSFET is in cutoff mode, there is no conduction between the power source and the Ethernet port, and the PSE does not supply power to the Ethernet port. A detection pin of the PSE chip is connected to the Ethernet port, so as to perform a detection operation on the Ethernet port. If the PSE chip further provides a classification function, the detection pin of the PSE chip may be further configured to perform a classification operation on the Ethernet port. The PSE chip may also perform a classification operation on the Ethernet port using another pin. The PSE chip may further perform a classification operation on the Ethernet port using another pin along with the detection pin.

The value stored in the first register 102 includes at least one control bit, and each of the at least one control bit corresponds to one powering channel. A plurality of control bits in the value stored in the first register 102 may be mapped to a same powering channel. For example, the PSE chip has four powering channels. The first register 102 is an eight-bit register configured to control switch-on and switch-off of the powering channels, and all the eight bits are control bits and successively expressed as bit 7 to bit 0. When bit 7 to bit 4 are set to 1, the corresponding powering channels are switched off; when bit 3 to bit 0 are set to 1, the corresponding powering channels are switched on. Bit 7 and bit 3 are corresponding to powering channel 4, bit 6 and bit 2 are corresponding to powering channel 3, bit 5 and bit 1 are corresponding to powering channel 2, and bit 4 and bit 0 are corresponding to powering channel 1. For example, if bit 7 is set to 1 and bit 3 is set to 0, it indicates that powering channel 4 is switched off; if bit 7 is set to 0 and bit 3 is set to 1, it indicates that powering channel 4 is switched on; if bit 7 is set to 0 and bit 3 is set to 0, it indicates that no operation is performed on powering channel 4. It is an incorrect configuration that bit 7 is set to 1 and bit 3 is set to 1, which generally should not occur. If the error occurs due to reasons, such as a programming error, which operation (for example, switching off powering channel 4) should be performed is determined according to logic inside the PSE chip. The value stored in the first register 102 may also have a bit that is not a control bit, for example, an empty bit or a bit having another function. For example, the PSE chip has only one powering channel. The first register 102 is an eight-bit register configured to control switch-on and switch-off of the powering channel and there are two control bits, for example, bit 7 and bit 3. Bit 7 and bit 3 are corresponding to the only one powering channel. When bit 7 is set to 1, the powering channel is switched off; when bit 3 is set to 1, the powering channel is switched on.

The PSE chip receives, using the interface 106, a first instruction sent by the CPU. The first instruction is a write instruction. The first instruction includes a first slave address, a first command byte, and a first data byte. When writing data to the PSE chip using the IIC interface, the CPU needs to send one instruction. The CPU first sends a slave address of the PSE chip and sets an read/write (R/W) bit to 0. According to different designs, the IIC bus may have address space of 7 bits, 10 bits, or another length, such as, 16 bits. Taking a 7-bit address as an example, an independent bit, namely, the R/W bit, follows the 7-bit address that is sent by the CPU. If the R/W bit is 0, it indicates that the CPU is to write data to the PSE chip; if the R/W bit is 1, it indicates that the CPU is to read data from the PSE chip. The first byte that is sent after the slave address by the CPU is a command byte, and it is determined according to the command byte that a next byte, namely, a data byte, is written to which register of the PSE chip. After the command byte, the CPU sends the data byte, where the data byte indicates data that is to be written by the CPU to a register specified by the command byte. A slave address in the first instruction is the first slave address, a command byte in the first instruction is the first command byte, and a data byte in the first instruction is the first data byte. A value of the first command byte is an address of the first register. A PSE chip with an address being the first slave address changes, in response to the first instruction, the value stored in the first register 102 to the first data byte in the first instruction. A length of the command byte and a length of the data byte depend on a design of a register in the PSE chip, and may be one or more bytes. The following uses one byte as an example for description.

The slave address of the PSE chip is generally specified according to levels of some pins of the PSE chip. For example, if the PSE chip has four address pins, $A_3, A_2, A_1,$ and $A_0$, the slave address of the PSE chip may be expressed as 010 $A_3A_2A_1A_0$ in binary and is generally expressed as 010 $A_3A_2A_1A_0$b (where, b is an abbreviation for binary), and then the PSE chip may support 16 different slave addresses, that is, a device has a maximum of 16 PSE chips. For example, if levels of $A_3$, $A_2$, $A_1$, and $A_0$ are successively high, low, high, and low, the slave address of the PSE chip is set to 0101010b. Three most significant bits (MSBs), 010, are a fixed value. According to different designs, a location of the fixed value in address space may be different. If a value of bits constituting the fixed value is different from a fixed value that is preset, this type of slave address cannot be obtained by adjusting a level of an address pin, where this type of slave address may also be referred to as a reserved address. For example, in the foregoing example, 1101010b is a reserved address.

The first register may be a register configured to control switch-on or switch-off of a powering channel. An address of the register configured to control switch-on or switch-off of a powering channel may be 19 in hexadecimal and is generally expressed as 19*h* (*h* is an abbreviation for hexadecimal). Then the value of the first command byte is 19*h*.

The first register may also be a register configured to control detection of a powering channel. The first register may also be a register configured to control classification of a powering channel. The first register may also be a register configured to control detection and classification of a powering channel. For example, if an address of the register configured to control detection and classification of a powering channel is 18*h*, the value of the first command byte is 18*h*. For example, the first register is an eight-bit register configured to control detection and classification of a powering channel, all the eight bits are control bits and successively expressed as bit 7 to bit 0. When bit 7 to bit 4 are set to 1, a detection operation is performed on corresponding powering channels; when bit 3 to bit 0 are set to 1, a classification operation is performed on the corresponding powering channels. Bit 7 and bit 3 are corresponding to powering channel 4, bit 6 and bit 2 are corresponding to powering channel 3, bit 5 and bit 1 are corresponding to powering channel 2, and bit 4 and bit 0 are corresponding to powering channel 1.

The first register may also be a register configured to control reset of a powering channel. If an address of the register configured to control reset of a powering channel is 1 Ah (a hexadecimal number), the value of the first command byte is 1Ah. For example, the first register is an eight-bit register configured to control reset of a powering channel, four least significant bits (LSBs) are control bits and are successively expressed as bit 3 to bit 0. When bit 3 to bit 0 are set to 1, corresponding powering channels are reset. Bit 3 corresponds to powering channel 4, bit 2 corresponds to powering channel 3, bit 1 corresponds to powering channel 2, and bit 0 corresponds to powering channel 1.

For example, if the CPU is to switch off powering channel 4 of a PSE chip with a slave address 0101010b, an instruction that is sent is 01010100000110011000000b.

After receiving the foregoing first instruction, the PSE chip determines that the slave address in the first instruction is the slave address of the PSE chip, and writes the first data byte, for example, 10000000b, to the first register according to the value of the first command byte. The PSE chip controls switch-on or switch-off of a powering channel according to the first data byte written to the first register. For example, powering channel 4 is switched off according to 10000000b. After implementing control over the powering channel, the PSE chip resets the first register. That is, the value in the first register is set to an initial value, namely, 00000000b.

For a purpose of controlling powering channels managed by a plurality of PSE chips at a time, the PSE chips set one or more reserved addresses as virtual addresses of a virtual powering group. If there is a plurality of virtual powering groups, virtual addresses of the plurality of virtual powering groups are different from one another. For example, if 1101010b is used as a virtual address of virtual powering group 1, all PSE chips of the PSE use 1101010b as the virtual address of virtual powering group 1, regardless of slave addresses of all the PSE chips. Similarly, 1101011b may be used as a virtual address of virtual powering group 2, 1101100b may be used as a virtual address of virtual powering group 3, and so on. Each PSE chip of all the PSE chips of the PSE stores a channel indication value of a virtual powering group. The channel indication value of the virtual powering group includes at least one used bit, and each of the at least one used bit corresponds to one of a powering channel of a PSE chip. A plurality of used bits in the at least one used bit may be corresponding to a same powering channel. A value of each of the at least one used bit indicates whether a corresponding powering channel is added to a virtual powering group. Generally, a used bit that is set to 1 indicates that a powering channel corresponding to the used bit is in a virtual powering group, and a used bit that is set to 0 indicates that a powering channel corresponding to the used bit is not in a virtual powering group. In an example in which the first register 102 is an eight-bit register and controls switch-on and switch-off of four powering channels, a channel indication value of a virtual powering group includes eight bits that are successively expressed as bit 7 to bit 0. Bit 7 and bit 3 are corresponding to powering channel 4, bit 6 and bit 2 are corresponding to powering channel 3, bit 5 and bit 1 are corresponding to powering channel 2, and bit 4 and bit 0 are corresponding to powering channel 1. For example, if bit 7 and bit 3 are set to 1, it indicates that powering channel 4 is in the virtual powering group.

The PSE chip receives, using the interface 106, a second instruction sent by the CPU. The second instruction is a write instruction. The second instruction includes a second slave address, the first command byte, and a second data byte. For a purpose of controlling powering channels managed by a plurality of PSE chips at a time, when the CPU writes data to the PSE chips using the IIC interface, a value of the second slave address in the sent second instruction is a virtual address of a virtual powering group. Because the virtual address of the virtual powering group is a reserved address, the second slave address is different from the first slave address. A command byte in the second instruction is the first command byte indicating that data is written to the first register. A data byte in the second instruction is the second data byte. In an example in which corresponding powering channels are switched off when bit 7 to bit 4 of the first register are set to 1 and the corresponding powering channels are switched on when bit 3 to bit 0 are set to 1, if the CPU is to switch on all the powering channels in the virtual powering group, the second data byte is 00001111b; if the CPU is to switch off all the powering channels in the virtual powering group, the second data byte is 11110000b.

The PSE chip changes, in response to the second instruction, the value stored in the first register to a calculated value, where the calculated value is a result obtained by calculation according to the second data byte in the second instruction and the channel indication value of the virtual powering group stored in the PSE chip. For example, the calculated value may be obtained by performing bitwise AND on the second data byte and the channel indication value. If a length of the channel indication value is different from a length of the second data byte, corresponding processing (for example, extending the length of the channel indication value until the length is the same as the length of the second data byte) is first performed on the channel indication value; after a processing result that the length of the channel indication value is the same as the length of the second data byte is obtained, bitwise AND is performed on the second data byte and the processing result to obtain the calculated value.

For example, if the CPU is to switch off all powering channels of a virtual powering group with a virtual address 1101010b, namely, virtual powering group 1, an instruction that is sent is 1101010000011001111110000b. If powering channel 4 and powering channel 2 of the PSE chip are in virtual powering group 1, a channel indication value of virtual powering group 1 of the PSE chip is 10101010b. The PSE chip performs, in response to the instruction, bitwise AND on 11110000b and 10101010b to obtain 10100000b. If a channel indication value of virtual powering group 1 is 1010b, the channel indication value is extended to 10101010b. Bitwise AND is performed on 11110000b and 10101010b to obtain 10100000b. 10100000b is written to a register identified by a command byte (00011001b) in the second instruction, that is, the first register, namely, a register 19 h. The PSE chip switches off powering channel 4 and powering channel 2 according to 10100000b written to the first register. Then, the PSE chip resets the first register. That is, the value in the first register is set to the initial value, namely, 00000000b. If powering channel 3 and powering channel 1 of another PSE chip are in virtual powering group 1, a channel indication value of virtual powering group 1 of the other PSE chip is 01010101b. The other PSE chip performs, in response to the instruction, bitwise AND on 11110000b and 01010101b to obtain 01010000b, and writes 01010000b to the register identified by the command byte in the second instruction, that is, the first register, namely, the register 19 h. The other PSE chip switches off powering channel 3 and powering channel 1 according to 01010000b written to the first register. Then, the other PSE chip resets the first register. That is, the value in the first register is set to the initial value, namely, 00000000b. After the CPU sends the foregoing instruction, the powering channels of the two PSE chips in virtual powering group 1 are all switched off according to the single instruction, and the CPU does not need to separately send the instruction to the two PSE chips to switch off the corresponding powering channels.

A channel indication value of a virtual powering group may be stored in a PSE chip in different forms. The following uses two examples to describe implementation of storage of the channel indication value of the virtual powering group.

In first implementation, the PSE chip further includes a second register, and the second register stores the channel indication value of the virtual powering group. If there is a plurality of virtual powering groups, the PSE chip includes a plurality of second registers, a correspondence between the plurality of virtual powering groups and the plurality of second registers is bijection. For example, a register a1$h$ is used as a register storing a channel indication value of virtual powering group 1, a register a2$h$ is used as a register storing a channel indication value of virtual powering group 2, a register a3$h$ is used as a register storing a channel indication value of virtual powering group 3, and so on. For example, if the register a1$h$ is the register storing the channel indication value of virtual powering group 1 and a value stored in the register a1$h$ is 10101010b, the channel indication value of virtual powering group 1 of the PSE chip is 10101010b.

When the CPU is to change a channel indication value of a virtual powering group, the CPU sends a third instruction to the PSE chip. The PSE chip receives, using the interface 106, the third instruction sent by the CPU. The third instruction is a write instruction. The third instruction includes the first slave address, a second command byte, and a third data byte, where the second command byte is an address of the second register. In response to the third instruction, the PSE chip changes a value stored in the second register to the third data byte. For example, if the CPU is to change a powering channel added to virtual powering group 1, which is of a PSE chip with a slave address 0101010b, to powering channel 4 and powering channel 1, and the register a1$h$ is the register storing the channel indication value of virtual powering group 1, an instruction that is sent is 010101001010000110011001b.

In second implementation, the PSE chip further includes a third register, where the third register stores one used bit of the at least one used bit of the channel indication value of the virtual powering group.

If there is a plurality of virtual powering groups, a value stored in the third register includes a plurality of indication bits. A mapping from the plurality of indication bits in the value stored in the third register to the plurality of virtual powering groups is injection. Each of the plurality of indication bits in the value stored in the third register stores the x$^{th}$ bit of at least one used bit of a channel indication value of a corresponding virtual powering group, where x is an integer greater than or equal to 1. For example, if the number of virtual powering groups is 8, channel indication values of the virtual powering groups are of two bits, the third register is an eight-bit register, and each bit of the value stored in the third register is an indication bit, there are two third registers in the PSE chip in total, each indication bit of 1$^{st}$ third register successively stores the first bit of channel indication values of the eight virtual powering groups, and each indication bit of 2$^{nd}$ third register successively stores the second bit of the channel indication values of the eight virtual powering groups. This manner of storing the channel indication values in the implementation is particularly suitable for a PSE chip with a single powering channel because the PSE chip with a single powering channel may use a channel indication value with only one bit to indicate whether the only one powering channel of the PSE chip is added to a virtual powering group. In this case, only one eight-bit third register is required for one PSE chip to support eight virtual powering groups. If 16 virtual powering groups need to be supported, only two eight-bit third registers are required.

When the CPU is to change a powering channel that is added to a virtual powering group, the CPU sends a fourth instruction to the PSE chip. The PSE chip receives, using the interface 106, the fourth instruction sent by the CPU. The fourth instruction is a write instruction. The fourth instruction includes the first slave address, a third command byte, and a fourth data byte, where the third command byte is an address of the third register. In response to the fourth instruction, the PSE chip changes a value stored in the third register to the fourth data byte. For example, if the CPU is to change a virtual powering group to which powering channel 4 of a PSE chip with a slave address 0101010b is added, to virtual powering group 1, virtual powering group 5, and virtual powering group 7, a register b1$h$ is a register storing the first bit of used bits in the channel indication value, and the first bit of the used bits in the channel indication value indicates whether powering channel 4 is added to the virtual powering group, an instruction sent by the CPU is 010101001011000110001010b.

The foregoing embodiment uses a PSE chip as an example for description. For a PSE chip including a plurality of quads, because slave addresses of the quads are different, the quads may be considered as independent PSE chips, and each of the PSE chips is the same as the PSE chip in the foregoing embodiment.

Figure 2:
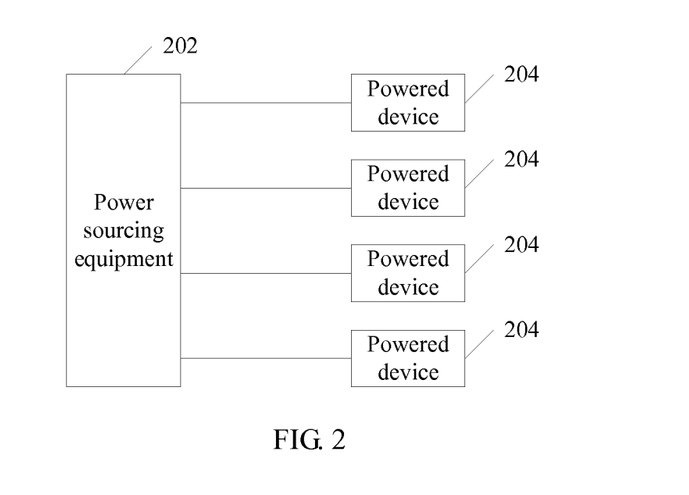
FIG. 2 is a structural diagram of a PoE system according to an embodiment of the present invention.

FIG. 2 is a structural diagram of a PoE system according to an embodiment of the present invention. The PoE system includes a PSE 202 shown in FIG. 1 and a plurality of powered devices 204. Each of the plurality of powered devices 204 is connected to an Ethernet port of the PSE. The powered devices 204 may be one or more of the following devices: an Internet Protocol (IP) camera, a Voice over Internet Protocol phone (VoIP phone), a wireless access point (AP), a network-attached storage (NAS), a thin client, an LED, a laser diode, and an electroluminescent wire. If the PoE system is an LoE system, the powered devices 204 are electric powered light sources. The electric powered light sources may be LEDs, laser diodes, or electroluminescent wires.

The foregoing descriptions are merely exemplary implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power sourcing equipment (PSE) chip comprising a first register, wherein the PSE chip is configured to:
control at least one powering channel of the PSE chip according to a value stored in the first register, wherein the value stored in the first register comprises at least one control bit, and wherein each of the at least one control bit corresponds to one of the at least one powering channel of the PSE chip;
change, in response to a first instruction, the value stored in the first register to a first data byte in the first instruction, wherein the first instruction is a write instruction, wherein the first instruction comprises a first slave address, a first command byte, and the first data byte, wherein the first slave address is an address of the PSE chip, and wherein a value of the first command byte is an address of the first register; and
change, in response to a second instruction, the value stored in the first register to a calculated value, wherein the second instruction is a write instruction, wherein the second instruction comprises a second slave address, the first command byte, and a second data byte, wherein the second slave address is a virtual address of a virtual powering group, and wherein the calculated value is a result obtained by calculation according to the second data byte in the second instruction and a channel indication value that is of the virtual powering group and stored in the PSE chip, wherein the channel indication value of the virtual powering group comprises at least one used bit, wherein each of the at least one used bit corresponds to one of the at least one powering channel of the PSE chip, and wherein a value of each of the at least one used bit indicates whether a corresponding powering channel is added to the virtual powering group.

2. The PSE chip according to claim 1, wherein the PSE chip further comprises a second register, and wherein the second register stores the channel indication value of the virtual powering group.

3. The PSE chip according to claim 2, wherein there is a plurality of virtual powering groups, wherein the PSE chip comprises a plurality of second registers, and wherein a correspondence between the plurality of virtual powering groups and the plurality of second registers is bijection.

4. The PSE chip according to claim 2, wherein the PSE chip is configured to change, in response to a third instruction, a value stored in the second register to a third data byte in the third instruction, wherein the third instruction is a write instruction, wherein the third instruction comprises the first slave address, a second command byte, and the third data byte, and wherein the second command byte is an address of the second register.

5. The PSE chip according to claim 1, wherein the PSE chip further comprises a third register, and wherein the third register stores one used bit of the at least one used bit of the channel indication value of the virtual powering group.

6. The PSE chip according to claim 5, wherein there is a plurality of virtual powering groups, wherein a mapping from a plurality of indication bits in a value stored in the third register to the plurality of virtual powering groups is injection, and wherein each of the plurality of indication bits in the value stored in the third register stores the $x^{th}$ bit of the at least one used bit of the channel indication value of a corresponding virtual powering group, wherein x is an integer greater than or equal to 1.

7. The PSE chip according to claim 5, wherein the PSE chip is configured to change, in response to a fourth instruction, the value stored in the third register to a fourth data byte in the fourth instruction, wherein the fourth instruction is a write instruction, wherein the fourth instruction comprises the first slave address, a third command byte, and the fourth data byte, and wherein the third command byte is an address of the third register.

8. The PSE chip according to claim 1, wherein the powering channel is between the PSE chip and a port configured to connect to a powered device.

9. A power sourcing equipment comprising:
a processor;
a memory;
a port powering circuit;
an Ethernet port; and
a power sourcing equipment (PSE) chip comprising a first register, wherein the PSE chip is configured to:
control at least one powering channel of the PSE chip according to a value stored in the first register, wherein the value stored in the first register comprises at least one control bit, and wherein each of the at least one control bit corresponds to one of the at least one powering channel of the PSE chip;
change, in response to a first instruction, the value stored in the first register to a first data byte in the first instruction, wherein the first instruction is a write instruction, wherein the first instruction comprises a first slave address, a first command byte, and the first data byte, wherein the first slave address is an address of the PSE chip, and wherein a value of the first command byte is an address of the first register; and
change, in response to a second instruction, the value stored in the first register to a calculated value, wherein the second instruction is a write instruction, wherein the second instruction comprises a second slave address, the first command byte, and a second data byte, wherein the second slave address is a virtual address of a virtual powering group, and wherein the calculated value is a result obtained by calculation according to the second data byte in the second instruction and a channel indication value that is of the virtual powering group and stored in the PSE chip, wherein the channel indication value of the virtual powering group comprises at least one used bit, wherein each of the at least one used bit corresponds to one of the at least one powering channel of the PSE chip, and wherein a value of each of the at least one used bit indicates whether a corresponding powering channel is added to the virtual powering group, wherein the processor is connected to the memory using a bus, wherein the processor is connected to the PSE chip, wherein the PSE chip is connected to the Ethernet port using the port powering circuit, wherein the memory stores a program, and wherein the processor sends the first instruction and the second instruction to the PSE chip according to the program.

10. The power sourcing equipment according to claim 9, wherein the powering channel is between the PSE chip and a port configured to connect to a powered device.

11. A power over Ethernet system, comprising:
a plurality of powered devices; and
a power sourcing equipment comprising:
a processor;
a memory;
a port powering circuit;
an Ethernet port; and
a power sourcing equipment (PSE) chip comprising a first register, wherein the PSE chip is configured to:
control at least one powering channel of the PSE chip according to a value stored in the first register, wherein the value stored in the first register comprises at least one control bit, and wherein each of the at least one control bit corresponds to one of the at least one powering channel of the PSE chip;
change, in response to a first instruction, the value stored in the first register to a first data byte in the first instruction, wherein the first instruction is a write instruction, wherein the first instruction comprises a first slave address, a first command byte, and the first data byte, wherein the first slave address is an address of the PSE chip, and wherein a value of the first command byte is an address of the first register; and
change, in response to a second instruction, the value stored in the first register to a calculated value, wherein the second instruction is a write instruction, wherein the second instruction comprises a second slave address, the first command byte, and a second data byte, wherein the second slave address is a virtual address of a virtual powering group, and wherein the calculated value is a result obtained by calculation according to the second data byte in the second instruction and a channel indication value that is of the virtual powering group and stored in the PSE chip, wherein the channel indication value of the virtual powering group comprises at least one used bit, wherein each of the at least one used bit corresponds to one of the at least one powering channel of the PSE chip, and wherein a value of each of the at least one used bit indicates whether a corresponding powering channel is added to the virtual powering group,
wherein the processor is connected to the memory using a bus, wherein the processor is connected to the PSE chip,
wherein the PSE chip is connected to the Ethernet port using the port powering circuit,
wherein the memory stores a program, and wherein the processor sends the first instruction and the second instruction to the PSE chip according to the program, and
wherein each of the plurality of powered devices is connected to the Ethernet port of the power sourcing equipment.

12. The power over Ethernet system according to claim 11, wherein the power over Ethernet system is a lighting over Ethernet system, and wherein the powered devices are electric powered light sources.

13. The power over Ethernet system according to claim 11, wherein each powering channel is between the PSE chip and a port configured to connect to at least one of the powered devices.

14. A power over Ethernet method comprising:
receiving, by a power sourcing equipment (PSE) chip, a first instruction;
changing, by the PSE chip in response to the first instruction, a value stored in a first register to a first data byte in the first instruction, wherein the first instruction is a write instruction, wherein the first instruction comprises a first slave address, a first command byte, and the first data byte, wherein the first slave address is an address of the PSE chip, a value of the first command byte is an address of the first register, the first register is in the PSE chip, the PSE chip is configured to control at least one powering channel of the PSE chip according to the value stored in the first register, wherein the value stored in the first register comprises at least one control bit, and wherein each of the at least one control bit corresponds to one of the at least one powering channel of the PSE chip;
receiving, by the PSE chip, a second instruction; and
changing, by the PSE chip in response to the second instruction, the value stored in the first register to a calculated value, wherein the second instruction is a write instruction, wherein the second instruction comprises a second slave address, the first command byte, and a second data byte, wherein the second slave address is a virtual address of a virtual powering group, wherein the calculated value is a result obtained by calculation according to the second data byte in the second instruction and a channel indication value that is of the virtual powering group and stored in the PSE chip, wherein the channel indication value of the virtual powering group comprises at least one used bit, wherein each of the at least one used bit corresponds to one of the at least one powering channel of the PSE chip, and wherein a value of each of the at least one used bit indicates whether a corresponding powering channel is added to the virtual powering group.

15. The power over Ethernet method according to claim 14, further comprising:
receiving, by the PSE chip, a third instruction; and
changing, by the PSE chip in response to the third instruction, a value stored in a second register to a third data byte in the third instruction, wherein the third instruction is a write instruction, wherein the third instruction comprises the first slave address, a second command byte, and the third data byte, wherein the second command byte is an address of the second register, wherein the second register is in the PSE chip, and wherein the second register stores the channel indication value of the virtual powering group.

16. The power over Ethernet method according to claim 15, wherein there is a plurality of virtual powering groups, wherein the PSE chip comprises a plurality of second registers, and wherein a correspondence between the plurality of virtual powering groups and the plurality of second registers is bijection.

17. The power over Ethernet method according to claim 14, further comprising:
receiving, by the PSE chip, a fourth instruction; and
changing, by the PSE chip in response to the fourth instruction, a value stored in a third register to a fourth data byte in the fourth instruction, wherein the fourth instruction is a write instruction, wherein the fourth instruction comprises the first slave address, a third command byte, and the fourth data byte, wherein the third command byte is an address of the third register, wherein the third register is in the PSE chip, and wherein the third register stores one used bit of the at least one used bit of the channel indication value of the virtual powering group.

18. The power over Ethernet method according to claim 17, wherein there is a plurality of virtual powering groups, wherein a mapping from a plurality of indication bits in the value stored in the third register to the plurality of virtual powering groups is injection, and wherein each of the plurality of indication bits in the value stored in the third register stores the $x^{th}$ bit of the at least one used bit of the channel indication value of a corresponding virtual powering group, wherein x is an integer greater than or equal to 1.

19. The power over Ethernet method according to claim 14, wherein the powering channel is between the PSE chip and a port configured to connect to a powered device.

* * * * *

UNITED STATES PATENT AND TRADEMARK OFFICE
CERTIFICATE OF CORRECTION

PATENT NO. : 9,223,374 B2
APPLICATION NO. : 14/675072
DATED : December 29, 2015
INVENTOR(S) : Yan Zhuang et al.

Page 1 of 1

It is certified that error appears in the above-identified patent and that said Letters Patent is hereby corrected as shown below:

Title Page, Item 30 Foreign Application Priority Data section should read:

Apr. 14, 2014 (CN) .................................. 201410146623.X

Signed and Sealed this
Fifth Day of July, 2016

Michelle K. Lee
*Director of the United States Patent and Trademark Office*